United States Patent [19]
Alexander et al.

[11] Patent Number: 5,472,315
[45] Date of Patent: Dec. 5, 1995

[54] ABRADABLE COATING IN A GAS TURBINE ENGINE

[75] Inventors: Eric J. Alexander; Robert W. Fawley; James C. Napier, all of San Diego, Calif.

[73] Assignee: Sundstrand Corporation, Rockford, Ill.

[21] Appl. No.: 149,412

[22] Filed: Nov. 9, 1993

[51] Int. Cl.[6] .................... F01D 11/12; B32B 27/06; B32B 27/20; B32B 27/28
[52] U.S. Cl. .................... 415/173.4; 415/174.4; 415/200; 428/473.5; 523/219
[58] Field of Search ............. 415/173.4, 174.4, 415/200; 277/53, 55, DIG. 6; 428/473.5, 262, 283; 523/218, 219

[56] References Cited

U.S. PATENT DOCUMENTS

| | | | |
|---|---|---|---|
| 2,995,294 | 8/1961 | Warnken | 415/200 |
| 3,346,175 | 10/1967 | Wiles . | |
| 3,547,455 | 5/1969 | Daunt . | |
| 3,575,427 | 4/1971 | Lapac | 415/217.1 |
| 3,843,278 | 10/1974 | Torell . | |
| 4,022,481 | 5/1977 | Long et al. | 415/173.4 |
| 4,177,308 | 12/1979 | Beeler | 427/117 |
| 4,349,313 | 9/1982 | Munroe et al. | 415/173.4 |
| 4,423,097 | 12/1983 | Mons et al. | 427/452 |
| 4,460,185 | 7/1984 | Grandey . | |
| 4,666,371 | 5/1987 | Alderson . | |
| 4,704,332 | 11/1987 | Brennan et al. | 415/174.4 |
| 4,861,643 | 8/1989 | Scollard | 277/DIG. 6 |
| 5,226,789 | 7/1993 | Donges | 415/173.4 |
| 5,304,032 | 4/1994 | Bosna et al. | 415/173.4 |

FOREIGN PATENT DOCUMENTS

| | | | |
|---|---|---|---|
| 3421196 | 12/1985 | Germany | 523/219 |

Primary Examiner—Edward K. Look
Assistant Examiner—James A. Larson
Attorney, Agent, or Firm—Ryan M. Fountain

[57] ABSTRACT

An abradable coating is provided for use on a composite substrate which has a coefficient of thermal expansion substantially similar to that of the substrate and which is formed with a matrix resin of the same type of resin used to form the substrate. In particular, with a composite substrate formed from carbon or graphite fibers impregnated with a polyimide resin, an abradable coating formed from carbon or glass microballoons in a polyimide resin matrix has been found to avoid delamination as a result of thermal cycling between −65° F. and 500° F. Accordingly, that abradable coating is particularly suitable for use with composite compressor shrouds in gas turbine engines and aircraft auxiliary power units.

25 Claims, 1 Drawing Sheet

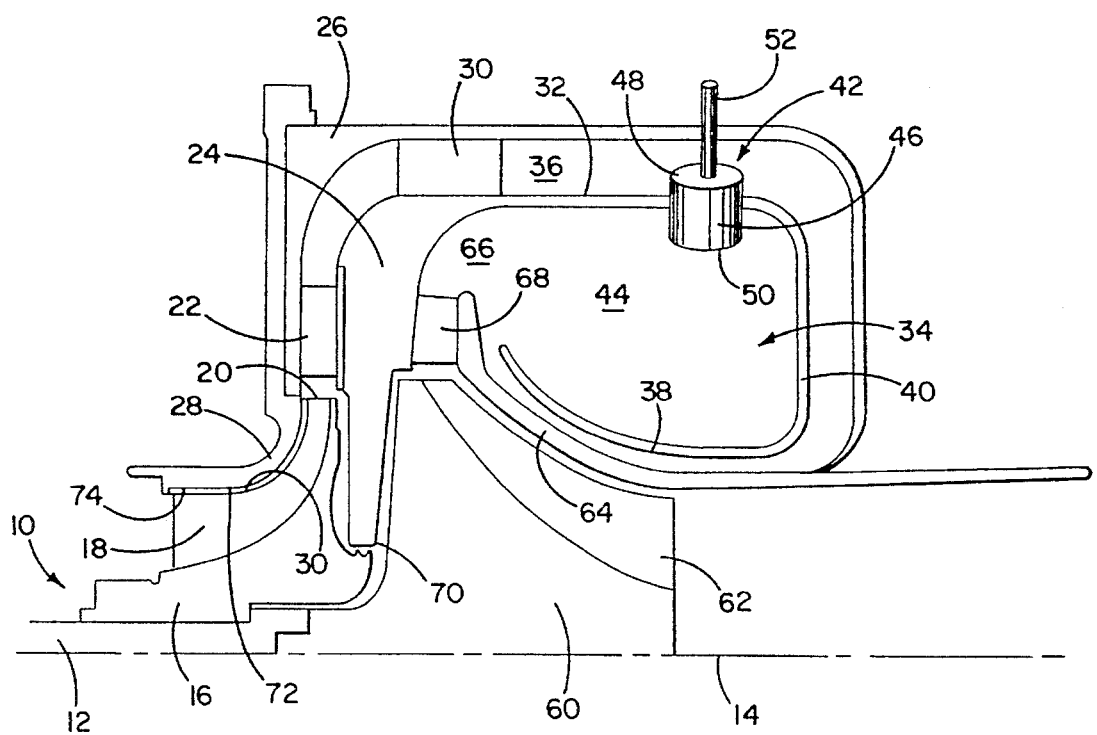

ABRADABLE COATING IN A GAS TURBINE ENGINE

FIELD OF THE INVENTION

The present invention relates generally to abradable coatings and, more particularly, to the application and use of such coatings in high temperature environments, such as with compressor shrouds for gas turbine engines to improve compressor efficiency.

BACKGROUND OF THE INVENTION

At the present time, gas turbine engines are employed in a wide variety of environments, including on board aircraft. These engines typically include turbocompressors having a compressor wheel with a plurality of spaced apart blades on that wheel. The compressor wheel is rotated about an axis within the engine housing to receive air from an inlet, accelerate and compress that air, and then discharge the air through an outlet. To be most efficient, the air is generally forced to flow between the space defined by the blades, the rotational hub of the compressor wheel and a portion of the engine housing commonly referred to as a compressor shroud. That shroud is normally positioned adjacent the compressor blades opposite the hub.

Compressor efficiency is often greatest when a minimal running clearance is maintained between the shroud and the blades to prevent leakage of the air over the top of the blades. However, during normal operation of the compressor, centrifugal forces acting on the compressor wheel cause it to "grow" radially in the direction of the shroud. Thus, establishing minimum running clearance at operational speeds of the compressor can be a complex task given the variables involved. An error in shroud position could result in a significant loss of operating efficiency or cause damage to the compressor when the blades bind against the shroud.

In prior compressors it has been suggested to employ abradable coatings on the shroud to directly establish the minimum running clearance. Specifically, on the surface of the shroud adjacent the blades a coating is formed from a material which can be readily abraded by the edges of the compressor blades. Initially, a small clearance, on the order of 0.010 inches, is established between the blades and the coating when the compressor is in a quiescent state. Upon operation of the compressor, the centrifugal forces may, for example, cause radial "growth" of the compressor on the order of 0.010–0.015 inches. As a result of that growth, the blades will contact the coating and wear away part of the coating to automatically establish the minimum running clearance during compressor operation. This clearance is substantially less than the clearance which exists when the compressor is not operating.

A number of factors must be considered in selecting an appropriate material for use as an abradable coating on a compressor shroud, depending at least in part upon the composition, use and operating environment of the compressor. For example, the coating should ideally be abradable without damage to the blades, compressor wheel or shroud, and the material removed also should not affect any components downstream from the compressor, such as the combustor or turbine in a gas turbine engine. With respect to use in line with a combustor, the effect of having the removed material pass through the combustion process should also be considered.

At the same time, it is desirable for the abradable material which is not intended to be removed by the blades to remain securely bonded to the shroud both while other portions of the coating are removed by the blades and afterwards for the operational life of the compressor. As an illustration, in gas turbine engines of aircraft, the compressor and shroud are subject to wide ranging temperatures during each operational cycle, from, for example, −65° F. (when quiescent at high altitude) to over 500° F. (when operating). Moreover, it is expected that these engines are to be relatively maintenance free for a large number of operational cycles. Therefore, an ideal abradable coating would remain secure despite repeated thermal cycling of compressor start up and shut down. The same would be true for compressors used in other environments and for other purposes since air compression itself typically causes elevated temperatures in multi-stage compressors and often more so in single stage compressors.

In aircraft applications it is also important that coating weight be minimized and that repair and/or refurbishing of the coating be relatively easy so that it is not necessary to replace the more expensive engine components as well. Moreover, the gas turbine engines found in auxiliary power units of aircraft often have complex shroud configurations. Accordingly, any material selected for such a coating would ideally be relatively easy to apply to such shapes.

Previously, a variety of abradable coatings have been suggested for use in compressor shrouds and related applications. By way of illustration, attention is directed to U.S. Pat. Nos. 3,346,175 to Wiles; 3,547,455 to Daunt; 3,843,278 to Torell; 4,460,185 to Grundey; and 4,666,371 to Alderson.

For compressor shrouds formed from metal, abradable coatings have been formed from metal alloy powder suspended in a polyester resin. However, since polyester resin often is effectively limited to temperatures under 350° F., such coatings would be similarly limited in their applications. To overcome that limitation and increase the temperature range to 550° F., it has been suggested to apply polyester-based coatings to the shroud by a process such as flame-spraying. It appears that this increase in operating range is available because the polyester component of the resin is largely pyrolized during the flame-spraying process. Thus, the metal powder becomes bonded to the metal of the shroud by the resin residue and intermetallic bonding.

However, the flame-spraying process is relatively complex, especially with complex shroud shapes and has not been entirely successful in providing acceptable coatings on shrouds or other substrates that are formed from composite materials. To improve fuel efficiency by weight reduction, improve long term operating performance and to decrease production costs it has been suggested that composite materials be employed, for example, in aircraft auxiliary power units. Such composites are often formed of a fibrous mass supported in a thermoset matrix material or resin.

Composite structures differ significantly from those of metal. In general, composites are characterized by a higher degree of stiffness and lower density. Composite parts using fibers of carbon, graphite or boron, in particular, can have higher damping ratios than corresponding metal parts. Also, composites are more resistant to heat and abrasion. Further, composites often have a relatively low coefficient of thermal expansion (CTE). As an illustration, it has been found that for composite matrices using carbon or graphite fibers and operating in a gas turbine engine environment the CTE is approximately $2.0 \times 10^{-6}$ in./in. °F.

Unfortunately, it has been found that the abradable coatings used on metal shrouds are not sufficiently durable on composite shrouds because they tend to delaminate or otherwise separate from the shroud as a result of the thermal cycling. It is now believed by the applicants that this delamination is at least in part a result of significant differences in the CTEs of the shroud and the coating. For exemplary comparison with the above-noted CTE, it has been found that the CTE of polyester/metal coatings is approximately $14 \times 10^{-6}$ in./in. °F.

In other environments and applications, different compositions of abradable coatings have previously been suggested. Some of these have provided a light weight, low density coating by suspending hollow particulate matter, referred to as "microballoons", in a matrix material. Specifically, it has been suggested to use an abradable coating of small phenolic spheres in an epoxy or rubber matrix. Unfortunately, such coatings have limited applicability with certain products, such as gas turbine engines for use as auxiliary power units in aircraft, because epoxy breaks down at temperatures in excess of 350° F. and epoxy and phenolic spheres have a relatively high CTE, on the order of $14.0 \times 10^{-6}$ in./in. °F. and $28.0 \times 10^{-6}$ in./in. F., respectively. Thus, such coatings would be subject to an undesirable level of delamination as a result of thermal cycling of the engine.

Accordingly, it is an object of the present invention to provide an improved abradable coating. Other objects include the provision of an abradable coating which is:

1. of low density and weight,
2. inexpensive to produce and relatively easy to apply, repair and renew,
3. chemically inert within the operating environment and sufficiently tough to resist cracking,
4. resistant to delamination as a result of thermal cycling over a wide range of temperatures,
5. durable at operating temperatures in excess of 500° F., and
6. well suited for application to compressor shrouds formed from composite materials and used in aircraft auxiliary power units.

Further objects include the provision of new and improved gas turbine engines and aircraft having auxiliary power units through the use of durable and inexpensive abradable coatings on composite components therein.

SUMMARY OF THE INVENTION

These and other objects of the present invention are attained by the provision of an abradable coating, for use on a composite substrate, which has a coefficient of thermal expansion substantially similar to that of the substrate and which is formed with a matrix resin of the same type of resin used to form the substrate. In particular, with a composite substrate formed from carbon or graphite fibers impregnated with a polyimide resin, an abradable coating formed from carbon or glass microballoons in a polyimide resin matrix has been found to avoid delamination as a result of thermal cycling between −65° F. and 500° F. Accordingly, that abradable coating is particularly suitable for use with composite compressor shrouds in gas turbine engines and aircraft auxiliary power units.

Other objects, advantages and novel features of the present invention will now be readily apparent to those of skill in the art upon consideration of the drawing and detailed description below.

BRIEF DESCRIPTION OF THE DRAWING

FIG. 1 is a fragmentary, sectional view of a gas turbine engine of an aircraft auxiliary power unit incorporating the coating of the present invention.

DETAILED DESCRIPTION OF PREFERRED EMBODIMENTS

An exemplary application of the present invention is illustrated in FIG. 1 in the environment of a radial in-flow turbine engine, such as can be used as an auxiliary power unit in an aircraft.

As shown, this engine includes a rotor, generally designated 10, which is made up of a shaft 12 journaled for rotation about an axis 14 by any suitable conventional means (not shown). A compressor hub 16 is fitted to the shaft and includes a plurality of blades 18 extending generally radially therefrom so as to define a radial discharge impeller. Compressed air is discharged at radially outer tips 20 of blades 18 into a vaned diffuser 22 supported between a front turbine shroud 24 and either an engine case 26 or an impeller shroud 28. The impeller shroud is in close proximity to edges 30 of blades 18 remote from hub 16.

From diffuser 22, the compressed air is typically routed from flow in a radial direction to flow in an axial direction and through deswirl vanes 30. These deswirl vanes are disposed between case 26 and radially outer wall 32 of a combustor, generally designated 34, contained within case 26. A space 36 between radially outer wall 32 and case 26 defines a plenum for the compressed air.

The combustor also includes a radially inner wall 38 and a radial wall 40 interconnecting inner wall 38 and outer wall 32. A plurality of equally angularly spaced fuel injectors, generally designated 42, are, for example, mounted on radially outer wall 32 of combustor 34 and serve to direct the compressed air and fuel to the interior 44 of combustor 34, whereat the two are combusted to provide hot gases of combustion.

Typically, each fuel injector 42 may be aimed generally tangentially to space 44 and includes an air blast tube 46 having an entrance end 48 within a plenum 36 and an exit end 50 within combustor 34. A tube 52 is connected at one end to a conventional source of fuel (not shown) and has an open end within air blast tube 46 through which fuel is injected into combustor 34.

A further hub 60 is mounted to shaft 12 and includes turbine blades 62 to define a turbine wheel. In close proximity to blades 62 is a rear turbine shroud 64 which is slightly spaced from radially inner wall 38. As a consequence, dilution air from plenum 36 may flow entirely about combustor 34 for cooling purposes prior to entering combustion space 34. If desired, openings may be located elsewhere in one or more of walls 32, 38 and 40 for the provision of a film of air cooling or the introduction of dilution air, as well known in the art.

Immediately downstream of combustor outlet 66 is a series of vanes 68 which extend between front turbine shroud 24 and rear turbine shroud 64 and define a nozzle arrangement for directing hot gases of combustion at blade 62 to drive the turbine wheel, and, thus, the compressor. Blades 68 are preferably in an annular array about axis 14. Combustor 34, in preferred embodiments, is also an annularly centered on axis 14. Also, a labyrinth seal 70 depends from front turbine shroud 24 into a space between hubs 16 and 60 to isolate the compression side of the engine from the turbine side thereof.

To receive the abradable coating of the present invention, in preferred embodiments compressor shroud 28 includes a slight recess 74 on its inner surface facing blades 18.

Abradable coating 72 is applied to fill recess 74. By way of example, shroud 28 is formed from a composite material, such as a fibrous mass impregnated with a resin. One such type of suitable resin for high temperature applications is polyimide resin from the family known as PMR-15, as developed by NASA. A commercially available resin of this type is sold under the mark Hycomp M310 by Hycomp, Inc. of Cleveland, Ohio. Similarly, carbon or graphite fibers can be advantageously used as the fibrous mass.

With such a shroud as the substrate, abradable coating 72 is selected and applied to allow blades 18 to "wear in" to close proximity with coating 72 and shroud 28. Thus, the compressor can achieve maximum efficiency when the engine is operating at its rated speed. Preferably, abradable coating 72 is formed from particulate matter suspended in a matrix material. In general, it is advantageous for the particulate matter to have a low coefficient of thermal expansion, on the order of the CTE of the fibrous mass of the shroud composite, and to have low density. At the same time, the matrix material is preferably operable over a wide range of temperatures.

For example, the particulate matter can be provided in the form of microballoons and the matrix material selected to be a resin. It has been found to be advantageous to use a polyimide resin identical to or similar in characteristics to that resin used in the shroud composite. At the same time, the microballoons are preferably formed from carbon or glass material.

The term "microballoon" as used herein describes a hollow, thin-walled structure which may be spherical or any other essentially closed shape. Such microballoons are also commonly known by a number of alternative terms including "microspheres", or "hollow particles". Preferably, the microballoons are present in the abradable coating of the invention to the extent of between two and four parts by volume of microspheres per one part of resin, with the microballoons having a preferred size in the range of 10–100 microns ($10^{-6}$ meters). Such microballoons are commercially available from a variety of sources. One source for hollow carbon microspheres is Versa Manufacturing Co., in Chantilly, Va.

Forming abradable coating 72 from such materials can provide several beneficial results. Such coatings resist delamination and cracking despite repeated compressor cycling over a wide temperature range, from −65° F. to at least 550° F. This is presently believed to occur because of the close match of the CTEs of the shroud and the abradable coating. For example, the CTE of this type of abradable coating can be less than $9.0\times10^{-6}$ in./in. °F. However, even though abradable coating 72 is tough and durable in that regard, it remains sufficiently abradable and soft by comparison to blades 18 to avoid damaging the edges of blades 18. Further, abradable coating 72 and its components are substantially unaffected by exposure to the chemicals (aromatic and aliphatic hydrocarbons, alcohols, hydraulic fluids, JP-4 fuel and kerosenes) and operating environment of gas turbine engines, particularly those used as auxiliary power units in aircraft. At the same time, abradable coating 72 is easy to apply to shroud 28 both initially and for any repair or refurbishing after extended use. Thus, the present invention contributes to the suitability and advantageousness of using composite materials in compressors and engines.

According to one embodiment of the invention, the coating may be applied by a method including the steps of: (a) mixing the resin and microballoons in the desired proportions to form a mixture of resin and microballoons; (b) applying the mixture of resin and microballoons with a brush or spatula to the surface of composite shroud 28; and (c) subjecting shroud 28 to a heating cycle to cure the resin and to bond the mixture of resin and microballoons securely to shroud 28 to form abradable coating 72. With this embodiment of the invention the method of applying abradable coating 72 may require an additional step of: (d) machining or sanding the cured coating 72 to provide a desired contour or surface finish. This method can be used for initial application or repair or refurbishing.

Alternatively, the step (b) of applying mixture to the shroud 28 may be carried out by spraying the mixture of resin and microballoons onto the shroud 28. In a preferred, alternative method (and especially suited for initial application), the mixture of resin and microballoons are applied to a surface of a mold utilized for forming shroud 28. The fibrous mass and resin utilized to form shroud 28 are then placed into the mold and shroud 28 and abradable coating 72 are simultaneously cured to form an integral assembly. Following the step of curing, shroud 28, with abradable coating 72 integrally bonded thereto, is removed from the mold. This method of manufacture provides an advantage in that the inner surface of abradable coating 72 will conform to the shape of the mold, thereby eliminating the need for machining or sanding to achieve the desired contour of the inner surface of shroud 28.

During initial "run in" of the compressor, blades 18 wear away a portion of abradable coating 72. The resin, being relatively soft in comparison to the blades 18, is cut away by the motion of blades 18. The microballoons, by virtue of their small size, are largely swept away intact from the resin, i.e. without being shattered, and carried downstream by the air under compression. Due to their extremely small size and mass and the chemically inert nature of the materials used in their construction, the microballoons which are abraded away are able to pass through the engine components downstream from the compressor without causing wear or other damage to such components.

Those skilled in the art will recognize that although the instant invention has been specifically described herein as including microballoons of a material having a low coefficient of thermal expansion, other structural forms of particulate matter may also be utilized with equal efficacy in practicing the instant invention. The selection of the "microballoon" structure for the particulate matter used in the various exemplary and preferred embodiments described herein was made in part on the basis of cost and the availability of a low density form of a particulate matter formed from a material having a low coefficient of thermal expansion. Accordingly, in practicing the instant invention, other structural shapes of hollow or solid particulate matter could also be utilized in place of the microballoons as described herein so long as such particulate matter was formed of a material having a low coefficient of thermal expansion similar to that of the substrate to which it is applied.

Similarly, although the instant invention has been described in considerable detail with reference to certain embodiments and methods thereof, the same is by way of illustration and example only and not to be taken as a limitation. For example, although aircraft component applications have been specifically addressed, the present invention may also be useful where abrasive coatings are needed for use over a wide temperature range, particularly if close-fitting rotatable components are involved. Accordingly, the spirit and scope of the present invention are limited only by the terms of the claims herein.

What is claimed is:

1. In an apparatus having a substrate formed from composite material, that material including a fibrous mass impregnated with a resin, an abradable coating applied to said composite material, comprising:

a matrix formed from said resin and particulate material suspended in said resin, said particulate material being formed as microballoons having a coefficient of thermal expansion and included in a ratio as compared to said resin such that said abradable coating exhibits a coefficient of thermal expansion substantially similar to the coefficient of thermal expansion of said substrate, thereby allowing said abradable coating to be retained on said substrate over a wide range of temperatures.

2. The apparatus according to claim 1 wherein said coefficient of thermal expansion of said microballoons is less than $9.0 \times 10^{-6}$ in./in. °F.

3. The apparatus according to claim 1 wherein the volumetric ratio of microballoons to resin in said matrix is at least two to one.

4. A compressor comprising:

a compressor wheel and a shroud disposed over at least part of said compressor wheel;

said compressor wheel being rotatable and having a hub with a plurality of compressor blades on said hub;

said shroud being formed from a composite material having a fibrous mass impregnated with a resin; and said shroud having an abradable coating thereon, that coating being formed from a mixture of particulate matter and the same type of resin as the resin that is formed in said shroud.

5. The compressor according to claim 4 wherein during compressor operation said blades move in close proximity to said shroud and said coating is initially subject to abrasion from said blades at certain temperatures and speeds of compressor operation.

6. The compressor according to claim 5 wherein said resin is formed from materials which are relatively soft in comparison with said blades and said particulate matter includes microballoons of a sufficiently small size that they are swept away relatively intact by said abrasion.

7. The compressor according to claim 5 wherein:

said resin is formed from thermosettable polyimide material;

said particulate matter is formed as microballoons of sizes less than 0.001 inches.

8. The compressor according to claim 7 wherein said fibrous mass and said microballoons are formed from carbon materials.

9. The compressor according to claim 8 wherein said temperatures exceed 450° F.

10. A gas turbine engine comprising:

a rotor movable about a rotational axis and including a compressor wheel and a turbine wheel, said compressor wheel having a hub with a plurality of blades on that hub, said turbine wheel being formed so as to receive gases of combustion and be driven thereby to in turn drive said compressor wheel, a compressor shroud surrounding said blades in close proximity thereto and being formed from a composite material, that composite material including a fibrous mass impregnated with a resin, a source of fuel, a combustor means, in fluid communication with said compressor wheel, for receiving compressed air therefrom and fuel from said source and combusting said air and fuel to provide said gases of combustion, a turbine nozzle means, connected to said combustor means and adjacent said turbine wheel, for directing said gases of combustion at said turbine wheel, and an abradable coating on said shroud adjacent to said blades, said coating being formed from particulate matter suspended in a matrix including said resin.

11. The gas turbine engine according to claim 10 wherein said resin is formed from polyimide materials and said particulate matter includes microballoons formed from materials which are chemically inert with respect to the materials used to form said gas turbine engine and the chemicals of combustion.

12. The gas turbine engine according to claim 11 wherein said fibrous mass and said microballoons are formed from carbon materials.

13. The gas turbine engine according to claim 12 wherein the coefficients of thermal expansion of said fibrous mass and said microballoons are substantially similar.

14. An aircraft having a gas turbine engine therein for use as an auxiliary power unit, said engine including a compressor and a shroud disposed about said compressor, said compressor including a hub and a plurality of blades extending outwardly from said hub toward said shroud, said hub having a central axis and being rotatable about said axis, said compressor and said shroud being subject to thermal cycling between operational temperatures and at rest temperatures, said shroud being formed from composite materials including a fibrous mass suspended in a matrix including a resin, and said shroud also including an abradable coating thereon, said abradable coating being formed from materials having a coefficient of thermal expansion sufficiently similar to the coefficient of thermal expansion of said shroud and applied to said shroud such that it does not separate from said shroud as a result of said thermal cycling.

15. An article of manufacture comprising:

a substrate formed from composite material including a fibrous mass impregnated with a resin; and an abradable coating applied to a surface of said substrate, said abradable coating including particulate matter suspended in said resin.

16. The article of manufacture according to claim 15 wherein said abradable coating is applied to said substrate by the process of first mixing said resin and said particulate matter together in the desired proportions to form a mixture, then mechanically applying said mixture to the surface of said substrate via brush or spatula, thereafter subjecting said substrate to a heating cycle to cure said resin and bond said mixture to said surface, and next mechanically finishing the cured mixture to a desired contour or surface.

17. The article of manufacture according to claim 15 wherein said abradable coating is applied to said substrate by the process of: (a) mixing the resin and particulate matter of the abradable coating in a desired proportion to form a mixture of resin and particulate matter; (b) applying the mixture to a surface of a mold utilized for forming the article of manufacture; (c) placing the fibrous mass and the resin of the substrate into the mold; and (d) curing the resin, thereby providing an article of manufacture having said abradable coating integrally bonded to said substrate.

18. The article of manufacture of claim 15 wherein the fibrous mass is comprised of carbon fibers.

19. The article of manufacture of claim 15 wherein the resin is selected from a family of resins known as polyimides.

20. The article of manufacture of claim 15 wherein the particulate matter includes microspheres.

21. The article of manufacture of claim 20 wherein the microspheres are hollow.

22. The article of manufacture of claim 20 wherein the microspheres are formed from glass.

23. The article of manufacture of claim 20 wherein the microspheres are formed from carbon.

24. The article of manufacture of claim 20 wherein the abradable coating includes between two and four parts by volume of microspheres per one part by volume of resin.

25. The article of manufacture of claim 15 wherein said composite substrate and said abradable coating have closely matched coefficients of thermal expansion.

* * * * *